United States Patent
Nishimoto et al.

(10) Patent No.: US 10,300,776 B2
(45) Date of Patent: May 28, 2019

(54) WEATHER STRIP

(71) Applicant: NISHIKAWA RUBBER CO., LTD., Hiroshima-shi, Hiroshima-ken (JP)

(72) Inventors: Yoshitaka Nishimoto, Hiroshima-ken (JP); Takeshi Ueda, Hiroshima-ken (JP); Hiroyuki Kawakami, Hiroshima-ken (JP)

(73) Assignee: NISHIKAWA RUBBER CO., LTD., Hiroshima-Shi, Hiroshima-Ken (JP)

( * ) Notice: Subject to any disclaimer, the term of this patent is extended or adjusted under 35 U.S.C. 154(b) by 0 days.

(21) Appl. No.: 15/880,142

(22) Filed: Jan. 25, 2018

(65) Prior Publication Data

US 2018/0215244 A1 Aug. 2, 2018

(30) Foreign Application Priority Data

Feb. 1, 2017 (JP) .................................. 2017-016816
Jan. 19, 2018 (JP) .................................. 2018-007602

(51) Int. Cl.
*B60J 10/15* (2016.01)
*B60J 10/80* (2016.01)

(52) U.S. Cl.
CPC ............... *B60J 10/15* (2016.02); *B60J 10/80* (2016.02)

(58) Field of Classification Search
CPC .................................. B60J 10/15; B60J 10/80
See application file for complete search history.

(56) References Cited

U.S. PATENT DOCUMENTS

| | | | | |
|---|---|---|---|---|
| 4,819,381 A | * | 4/1989 | Kitaura | E06B 7/2309 49/489.1 |
| 5,649,405 A | * | 7/1997 | Morihara | B60J 10/24 296/146.2 |
| 8,353,130 B2 | | 1/2013 | Fukuta et al. | |
| 2007/0122570 A1 | * | 5/2007 | Honda | B32B 27/32 428/31 |
| 2009/0100761 A1 | * | 4/2009 | Hashimoto | B60J 10/24 49/475.1 |
| 2011/0219701 A1 | * | 9/2011 | Fukuta | B60J 10/24 49/493.1 |
| 2016/0264748 A1 | | 9/2016 | Okita et al. | |
| 2016/0362832 A1 | * | 12/2016 | Murahara | D06N 3/14 |
| 2017/0335091 A1 | * | 11/2017 | Park | C08K 13/02 |

FOREIGN PATENT DOCUMENTS

| | | | |
|---|---|---|---|
| JP | 2005-23096 | * | 1/2005 |
| JP | 2011183935 A | | 9/2011 |
| JP | 5587062 B2 | | 9/2014 |
| JP | 2016169243 A | | 9/2016 |

* cited by examiner

*Primary Examiner* — Gregory J Strimbu
(74) *Attorney, Agent, or Firm* — Holtz, Hotlz & Volek PC

(57) ABSTRACT

A weather strip includes an installation base member and a seal member. The installation base member is configured to operably couple to a peripheral edge of a panel. The seal member is integrally molded with the installation base member and configured to make elastic contact with a peripheral edge of an opening in a body of an automobile when the panel is in a closed position. The seal member includes sponge material which has a specific gravity that falls within a range of 0.35 to 0.65 and a loss elastic modulus of not more than 0.25 MPa. More preferably, the sponge material has a loss elastic modulus of not more than 0.20 MPa.

6 Claims, 4 Drawing Sheets

WEATHER STRIP

CROSS REFERENCE TO RELATED APPLICATION

This application claims the benefit under 35 USC § 119 of JP Patent Applications JP 2017-016816 filed Feb. 1, 2017 and JP 2018-007602 filed Jan. 19, 2018, the entire disclosure of which is incorporated herein by reference.

BACKGROUND INFORMATION

The present invention relates to weather strips configured to operatively couple to at least one of peripheral edges of panels and peripheral edges of openings in bodies of automobiles. When the panels are in closed positions, the weather strips seal gaps between the panels and the bodies of the automobiles by making elastic contact with the bodies of the automobiles or the panels. The panels include: side doors; back doors, trunk lids; and hoods.

As shown in FIG. 6, a weather strip 10 has been configured to operatively couple to a peripheral edge of a side door 1 of an automobile. When the side door 1 is in a closed position, the weather strip 10 makes elastic contact with a body 2 and seals a gap between the side door 1 and the body 2.

As shown in FIG. 7, the weather strip 10 includes an installation base member 11 and a hollow seal member 12. The installation base member 11 is fit on a frame 1a of the side door 1. The hollow seal member 12 is integrally molded with the installation base member 11 and is configured to make elastic contact with a peripheral edge of an opening in the body 2 of the automobile when the side door 1 is in the closed position. The hollow seal member 12 generally includes EPDM sponge rubber having specific gravity that falls within a range of 0.35 to 0.65 in consideration of flexibility, weather resistance, extension, and rigidity.

In order for the hollow seal member 12 to make elastic contact with the body 2 when the side door 1 is in the closed position, the weather strip 10 is required to perform an improved deformation followability. Also, in order to prevent entrance of water, wind, dust, and noise from outside, the weather strip 10 is required to perform a sealing function. The sealing function is an airtight condition formed by a reaction, from the weather strip 10, of a degree equivalent to closure of the side door 1. The sealing function of the weather strip 10 is checked by adjusting compression load value (value measured by a test of compressing, bending, and deforming the hollow seal member 12 in a pressing and deforming direction at a speed of 20 mm/min), which is a general evaluation index for the weather strip 10.

As the reaction of the weather strip 10 increases, force for closing the side door 1 is increased. As a result, door closability is degraded, that is the door becomes hard to close.

In this connection, in order to improve the door closability of the weather strips on the panels, lowering the compression load value has been the sole solution. The solution includes partially reducing the hollow seal member 12 in thickness and employing materials low in specific gravity or elasticity as the hollow seal member 12 (see, Japanese unexamined Patent Publication No. 2011-183935 and Japanese examined Patent Publication No. 5587062).

Unfortunately, however, the hollow seal member 12, which is partially reduced in thickness or which includes the materials low in the specific gravity or the elasticity, is decreased in sealing surface pressure and degrades the sealing function including water cut off function of the weather strip 10 when the side door 1 is fully closed, in the closed position in other words.

This is caused by the fact that the compression load value has been believed to include only static reaction of the hollow seal member 12 and dynamic reaction of the hollow seal member 12 has not been taken into consideration.

More specifically, impact elasticity of rubber includes the static reaction and the dynamic reaction. The "static" and "dynamic" indicate speed for compression. The "static" indicates movement at a very low speed or even without speed at the time of compression. The "dynamic" indicates movement at a very high speed at the time of compression. The "static" affects the sealing function when the door is in the closed position. The "dynamic" affects the door closability when closing the door.

Difference in the compression load value depending on difference in the speed has been overlooked and has not been argued about. As shown in FIG. 8, when a hollow object, including rubber-like elastic body such as rubber, is compressed and movement of compression is stopped at a fixed compression amount, reaction of the hollow object temporarily jumps up to the maximum value at first, and then lowers to a stable value with the passage of time. The reaction in total (30+40) includes: reaction (30) relative to the static compression; and reaction (40) relative to the dynamic compression. The reaction (40) relative to the dynamic compression indicates viscosity of material. The static compression is a condition under the stable compression amount without movement for the compression. The dynamic compression is a condition in which the compression amount changes at the high speed.

In order to improve door closability, more specifically as means to close the door with a low energy, the inventors of the present invention considered bringing the viscosity (loss elastic modulus: performance for converting kinetic energy into thermal energy) of the material essentially identical to zero.

As the value "40", which indicates the viscosity of the material forming the hollow seal member 12 decreases, the compression load value does not vary under the static compression or the dynamic compression. Accordingly, it is possible to lower dynamic compression load when closing the door, while maintaining static sealing surface pressure, in other words while keeping the sealing function (including water cut off function) high when the door is in the closed position.

Japanese unexamined Patent Publication No. 2011-183935 and Japanese examined Patent Publication No. 5587062 aim at preventing degradation in the door closability but do not teach or suggest the loss elastic modulus, which affects the door closability. The loss elastic modulus indicates the viscosity of the material forming the hollow seal member.

Accordingly, an object of the present invention is to provide the weather strips improved in the door closability by laying emphasis on the viscosity of the material of the rubber-like elastic body.

SUMMARY

In order to achieve the above-mentioned object, according to one aspect of the invention, a weather strip (20) is provided, the weather strip (20) including an installation base member (21) and a seal member (22). The installation base member (21) is configured to operably couple to at least one of a peripheral edge of a panel (1) and a peripheral edge of an opening in a body (2) of an automobile. The seal member (22) is integrally molded with the installation base member (21). The seal member (22) is configured to make elastic contact with at least one of the peripheral edge of the opening in the body (2) of the automobile and the peripheral edge of the panel (1) when the panel (1) is in a closed position. The seal member (22) includes sponge material of rubber-like elastic body having specific gravity that falls within a range of 0.35 to 0.65 and a loss elastic modulus of not more than 0.25 MPa.

In addition, according to an aspect of the present invention, the seal member (22) includes the sponge material of rubber-like elastic body having the specific gravity that falls within the range of 0.35 to 0.65 and the loss elastic modulus of not more than 0.20 MPa.

In addition, according to an aspect of the present invention, the seal member (22) includes a hollow seal member and has a compression set (70° C.×200 hrs) of not more than 25%.

Symbols in parentheses show constituents or items corresponding to the drawings.

The present invention lays emphasis on viscosity of the material of the rubber-like elastic body for use as the seal member of the weather strip. Specifically, the sponge material of rubber-like elastic body of the present invention has the specific gravity that falls within the range of 0.35 to 0.65 and the loss elastic modulus of not more than 0.25 MPa. As a result, energy amount as a dynamic compression load when closing the door can be decreased, while keeping the sealing function high when the door is in the closed position. The weather strip is configured to operatively couple to at least one of the peripheral edge of the panel and the peripheral edge of the opening in the body of the automobile. When the panel is in the closed position, the weather strip is configured to make elastic contact with at least one of the peripheral edge of the opening in the body of the automobile and the peripheral edge of the panel. The panel includes: side doors; back doors, trunk lids; and hoods.

Accordingly, door closability can be improved while securing the sealing function, without such modifications in shape or structure as partially reducing the seal member in thickness as in the prior art.

In addition, with the configuration that the seal member includes the sponge material of rubber-like elastic body having the loss elastic modulus of not more than 0.20 MPa, the door closability is further improved.

In addition, with the configuration that the seal member includes the hollow seal member that is hollow in shape and has the compression set (70° C.×200 hrs) of not more than 25%, the hollow seal member is slightly strained even after years of use and is capable of maintaining the original shape (condition at early stage). Accordingly, compression amount needs not be increased at the early stage and the door closability is improved.

DETAILED DESCRIPTION

Figure 1:
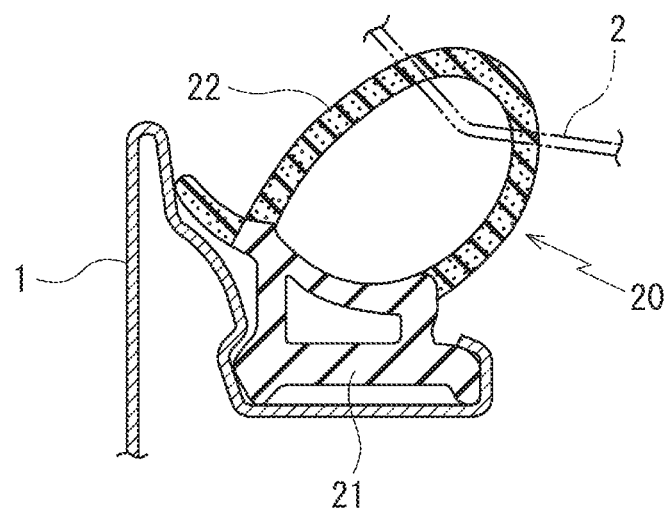
FIG. 1 is an enlarged cross-sectional view of a weather strip according to an embodiment of the present invention taken along line I-I of FIG. 6.
Figure 7:
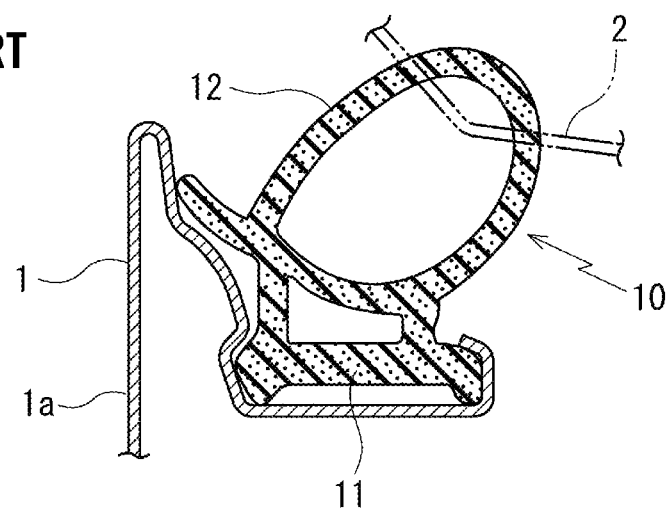
FIG. 7 is an enlarged cross-sectional view of a weather strip according to a prior art taken along line I-I of FIG. 6.

Referring to FIG. 1, a weather strip 20 according to an embodiment of the present invention will be described. In the same manner as a weather strip 10 (FIG. 7) according to a prior art, the weather strip 20 includes an installation base member 21 and a hollow seal member 22. The installation base member 21 is configured to operably couple to a side door 1 of an automobile. The hollow seal member 22 is integrally molded with the installation base member 21 and is configured to make elastic contact with a peripheral edge of an opening in a body 2 of the automobile when the side door 1 is in the closed position. The weather strip 20 is characterized by the material of the hollow seal member 22.

When constituents or items correspond to those in the prior art (FIG. 7), the same symbols are used.

The hollow seal member 22 of the weather strip 20 includes sponge material of rubber-like elastic body which has specific gravity that falls within a range of 0.35 to 0.65 and a loss elastic modulus of 0.23 MPa. In the present embodiment, the rubber-like elastic body is a rubber material mainly including EPDM (ethylene-propylene-diene rubber). Alternatively, the rubber-like elastic body may be another rubber material mainly including synthetic rubber other than EPDM or thermoplastic elastomer.

In the present embodiment, which lays emphasis on the viscosity of the sponge material of rubber-like elastic body forming the hollow seal member 22, loss elastic modulus which indicates viscosity was varied and tested. The results show that the sponge material of rubber-like elastic body for use as the hollow seal member 22 preferably has the specific gravity that falls within a range of 0.35 to 0.65 and the loss elastic modulus of not more than 0.23 MPa.

Figure 4:
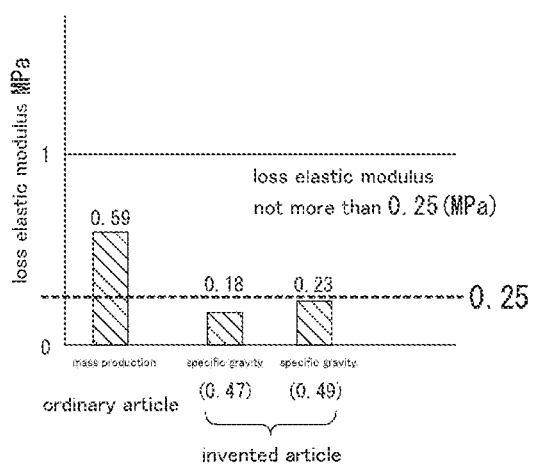
FIG. 4 is a graph illustrating a loss elastic modulus of a sponge material of the rubber-like elastic body forming a hollow seal member.
Figure 5:
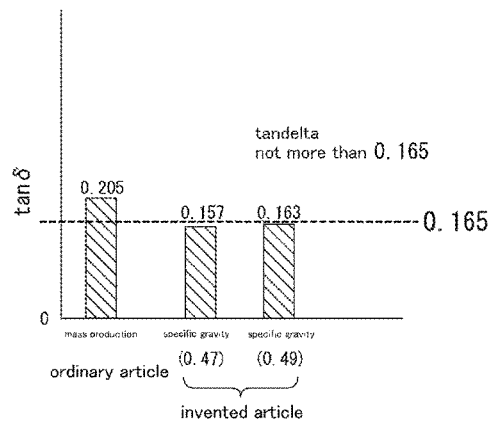
FIG. 5 is a graph illustrating a loss tangent (tan δ: tan delta) of the sponge material of the rubber-like elastic body forming the hollow seal member.

Conditions for measuring the loss elastic modulus were as follows: picking test pieces with a hollow shape 100 which was, in advance, subjected to a compression load value measurement to be discussed later; and subjecting the test pieces to a tensile mode under a plurality of frequencies, an atmosphere Air, and a temperature range that falls within a range of −80° C. to 100° C. by DVA-225 (IT KEISOKU SEIGYO KK) such that the loss elastic modulus under each temperature zone was measured one by one. FIG. 4 and FIG. 5 show results of the measurement under the temperature of 20° C. and frequency of 10.0 Hz. (Test method was based on JIS K7244-4 of Japanese Industrial Standards (JIS), test pieces were subjected to tensile method based on JIS K6394).

Table 1 shows test results of the test piece with the hollow shape 100 (invented article) in comparison with an ordinary article on static reaction and dynamic energy amount (energy amount at the time of the compression as a result of dynamic reaction). The test piece with the hollow shape 100 included the sponge material of rubber-like elastic body which has a specific gravity of 0.49 and a loss elastic modulus of 0.23 MPa. The sponge material of the rubber-like elastic body of the ordinary article had the loss elastic modulus of 0.59 MPa and the specific gravity of 0.55.

TABLE 1

|  | static reaction (N/100 mm) | dynamic reaction (×10⁻³ J/100 mm) |
| --- | --- | --- |
| ordinary article | 8 | 78 |
| invented article | 8 | 54 |

Figure 2:
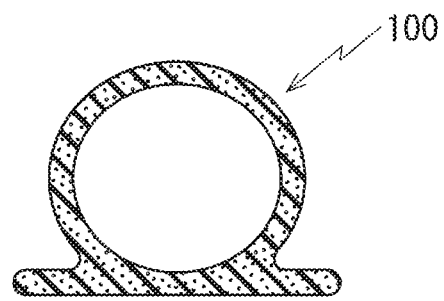
FIG. 2 is a cross-sectional view of a hollow shape of a test piece.

More specifically, the test piece with the hollow shape 100 (invented article) was compared with the test piece with the hollow shape 100 (ordinary article), both of which have the shape as shown in FIG. 2 (see Japanese unexamined Patent Publication 2016-169243). The test piece with the hollow shape 100 (invented article) included the sponge material of rubber-like elastic body which has the specific gravity of 0.49 and the loss elastic modulus of 0.23 MPa as in the present embodiment. The test piece with the hollow shape 100 (ordinary article) included the sponge material of rubber-like elastic body which has the specific gravity of 0.55 and the loss elastic modulus of 0.59 MPa.

Conditions for the test were as follows: fixing the test pieces with the hollow shape 100 on flat plates under an atmosphere of 23° C.; and compressing the test pieces with the hollow shape 100 by flat plates up to 50% of height of the test pieces with the hollow shape 100 from an upper side to find load value. The static reaction is the load value (index of sealing function) on the 50% of the height of the test pieces with the hollow shape 100 at a compression speed of 20 mm/min. An index of the dynamic energy amount is the energy amount required for compressing the test pieces with the hollow shape 100 by the flat plates up to 50% of the height of the test pieces with the hollow shape 100 from the upper side at the compression speed of 1.2 m/sec (index of door closability, integral calculus of the load value).

In case the test pieces with the hollow shape 100 of the invented article and the ordinary article have the same shapes, the invented article is lower in the static reaction than the ordinary article. Accordingly, the test piece with the hollow shape 100 of the invented article is adjusted (increased) in thickness such that the static reaction of the test piece with the hollow shape 100 of the invented article is equivalent to the ordinary article. As a result, the invented article has the static reaction of 8 (N/100 mm) and the dynamic energy amount of 54 (×10⁻³ J/100 mm). The ordinary article has the static reaction of 8 (N/100 mm) and the dynamic energy amount of 78 (×10⁻³ J/100 mm). The results show that the test piece with the hollow shape 100 of the invented article, which is greater in thickness than the ordinary article, is lower than the ordinary article in the energy amount as the result of dynamic reaction when deformed at a high speed (dynamic). The dynamic energy amount of the invented article is substantially 70% of the ordinary article.

Figure 8:
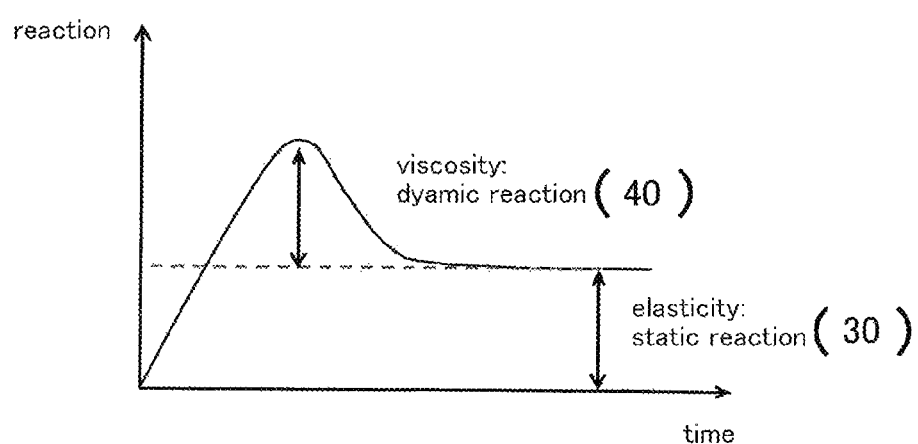
FIG. 8 is a graph illustrating a reaction of the hollow seal member.

In the graph shown in FIG. 8, the dynamic energy amount is the result of the dynamic reaction with the viscosity (40). The invented article is equivalent to the ordinary article in the static reaction (reaction after compression), lower in the dynamic energy amount, lower in the dynamic reaction, and more preferable in deformation followability. Accordingly, the invented article is excellent in door closability.

Figure 3:
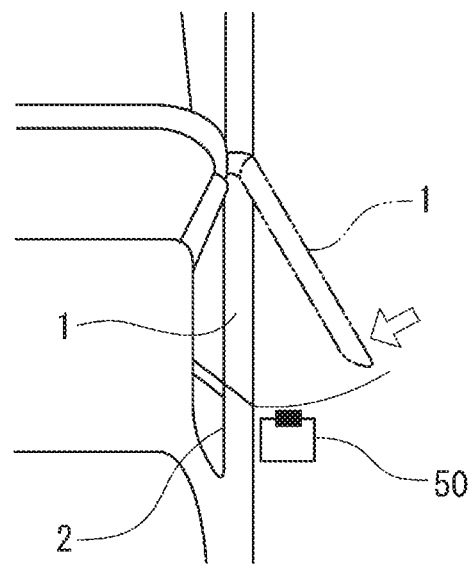
FIG. 3 is a plan view of an automobile with a speedometer measuring an opening/closing speed of a side door.

Next, the door closability was tested. Conditions for the test were as follows: opening and closing the side door 1 repeatedly; and measuring the shortest speed (speed at which a lock part passes by) for a door lock of the side door 1 to be locked by means of a speedometer 50 provided on an automobile as shown in FIG. 3. The speedometer 50 was arranged at a distance of 80 mm from an outer panel of the body 2 and at a distance of 10 mm from a door edge to which the side door 1 approaches closest.

Table 2 shows that the shortest speed for closing the door was 1.20 (m/sec) in the invented article and 1.33 (m/sec) in the ordinary article. The results show that the invented article enables full closure of the door at a lower speed than the ordinary article.

Figure 6:
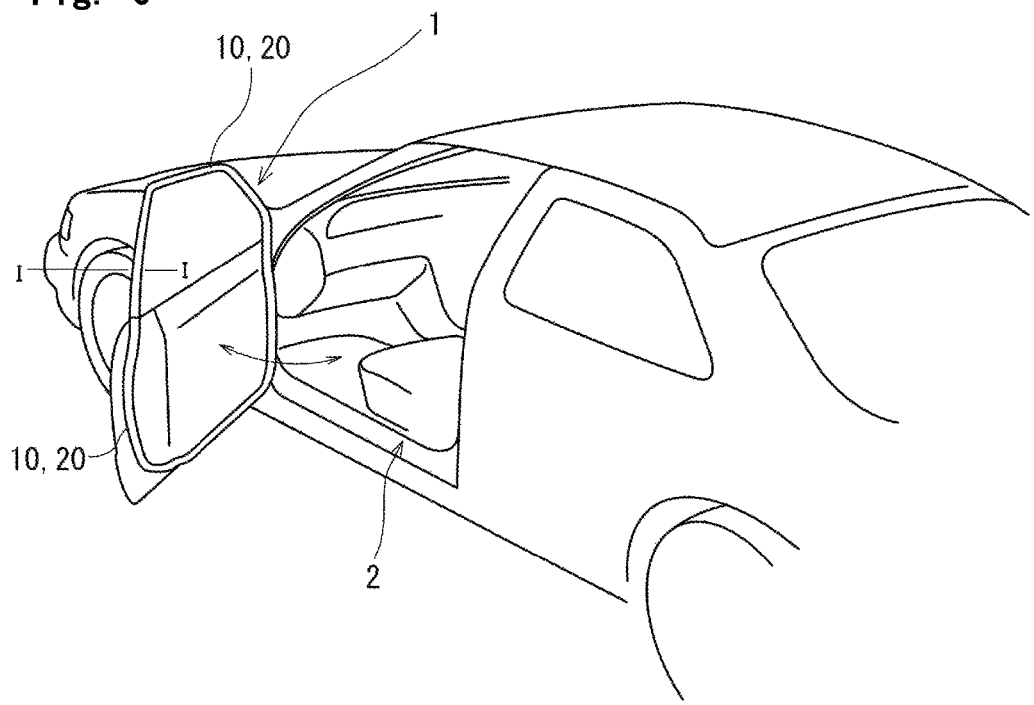
FIG. 6 is a perspective view of an automobile with the side door open.

The door closability was tested using the weather strips of the invented article and the ordinary article (10, 20 in FIG. 6), which substituted for the original weather strip and which were arranged on the door of the automobile. The invented article and the ordinary article for use in the test are test pieces which include the same sponge materials of the invented article or the ordinary article, not the test pieces of the hollow shape 100, and which are formed into the weather strips. Details of the test pieces are omitted. The test pieces may have a cross-sectional shape of FIG. 1. The test pieces as a whole, that is the installation base members 21 as well as the hollow seal members 22, include the sponge materials of the invented article or the ordinary article, respectively.

TABLE 2

|  | door closing speed (m/sec) |
| --- | --- |
| ordinary article | 1.33 |
| invented article | 1.2 |

The results show that the invented article enables closure of the side door 1 with smaller energy and is excellent in the door closability as compared with the ordinary article. It is generally believed that kinetic energy of an object which is moving at a stable speed is in proportion to the second power of the speed. If, as shown in Table 2, the ratio of the speed of the invented article to the speed of the ordinary article is 1.20/1.33=substantially 0.9 times, then the energy amount required for the invented article is substantially 0.8 (the second power of 0.9) times the energy amount required for the ordinary article. In other words, the invented article is conceivably decreased in the required energy amount for door closure by 20%. Accordingly, when the energy amount is converted into weight of the door, the weight of the door is decreased by 20%.

With the configuration that the hollow seal member 22 includes sponge material of rubber-like elastic body which has the specific gravity that falls within the range of 0.35 to 0.65 and the loss elastic modulus of not more than 0.23 MPa, the energy amount for compressing, bending, and deforming the hollow seal member 22 at the high speed is decreased by 20 to 30% as compared with the ordinary article.

In the present embodiment, the hollow seal member 22 of the invented article includes the sponge material of the rubber-like elastic body which has the specific gravity of 0.49 and the loss elastic modulus of 0.23 MPa. Next, specific gravity and the loss elastic modulus of the sponge material of the rubber-like elastic body was changed to measure the static reaction, and the dynamic energy amount from the test piece with the hollow shape 100, and prove the shortest speed for closing the door of the automobile. The results show that the sponge material of rubber-like elastic body having the loss elastic modulus of not more than 0.25 MPa controls the dynamic reaction, necessitates a lower dynamic energy amount, and is improved in the door closability (FIG.

4). In addition, the sponge material of rubber-like elastic body having the loss elastic modulus of not more than 0.20 MPa further controls the dynamic reaction and is further improved in the door closability.

In addition, with the configuration that the hollow seal member 22 includes the sponge material of rubber-like elastic body having the specific gravity of 0.47 and the loss elastic modulus of 0.18 MPa, the door closability is excellent.

In addition, as shown in FIG. 4 and FIG. 5, in case the hollow seal member 22 includes the sponge material of rubber-like elastic body having the specific gravity of 0.49 and the loss elastic modulus of 0.23 MPa, loss tangent (tan δ: tan delta) of the sponge material of the rubber-like elastic body is 0.163. In case the hollow seal member 22 includes the sponge material of rubber-like elastic body having the specific gravity of 0.47 and the loss elastic modulus of 0.18 MPa, the loss tangent (tan δ: tan delta) of the sponge material of the rubber-like elastic body is 0.157.

The results show that the hollow seal member 22 which has the loss tangent (tan δ: tan delta) of not more than 0.165, more preferably not more than 0.16, controls the dynamic reaction and is improved in the door closability.

Compression set (CS) of the sponge material of the rubber-like elastic body for use as the hollow seal member 22 has great influence on the door closability, and it is preferable that the compression set (CS) is low.

Conditions for finding the compression set (CS) were as follows: compressing samples of the hollow shape 100 as shown in FIG. 2 up to 50% of the height; treating the samples under a condition of 70° C.×200 hrs; and explaining the heights before and after the treatment in numbers. Conditions for measuring the height after the treatment were as follows: releasing the samples from the compression immediately after the treatment under the condition of 70° C.×200 hrs; and subjecting the sample to an atmosphere of 23° C. for 30 minutes.

$$\text{compression set (CS)}=(t0-t1)/(t0-ts)\times 100$$

t0: height before treatment (mm)
t1: height after treatment (mm)
ts: 50% of height of t0 (mm)

When the side door 1 is fully closed, the hollow seal member 22 of the weather strip 20 is compressed. As the hollow seal member 22 is kept compressed, a sealing surface of the weather strip 20 gradually has a compressed shape in cross section after years of use and does not revert (close to bent shape) to an original shape (condition at an early stage) capable of absorbing strain sufficiently. As the amount to revert to the original shape decreases, the reaction (sealing force) of the hollow seal member 22 decreases on a position of full closure of the door under a condition that the door is locked on the original position without shift.

In this connection, the weather strip 20 has been designed foreseeing the deformation after years of use. Specifically, in order for the weather strip 20 to perform sufficient reaction after years of use, the weather strip 20 includes a large compression amount at the early stage, in other words, the weather strip 20 is excessively compressed at the early stage. This configuration degrades the door closability at the early stage.

In this connection, the use of material which is hard to set (low in CS) after years of use keeps the strain slight after years of use and enables to maintain the original shape (condition at the early stage). Accordingly, the compression amount at the early stage needs not be large, it is not necessary to push the weather strip 20 strongly at the early stage, and the door closability is improved.

Table 3 shows the results of the comparison on properties between the sponge materials of the ordinary article and the invented article (Table 1 and Table 2).

The specific gravity is based on JIS K6268. The samples have the shape of the hollow shape 100 as shown in FIG. 2.

Conditions for measuring water absorption were as follows: cutting the samples of the hollow shape 100 as shown in FIG. 2 into 50 mm and measuring weight; immersing the samples in distilled water of which temperature is 23° C. in such a manner that upper ends of the samples are substantially 50 mm deep from the surface of water; reducing the compression up to 17 kPa and leaving the samples under the reduced compression for 5 minutes; returning the samples to a normal pressure and leaving the samples under the normal pressure for 3 minutes; picking the samples up from the distilled water; wiping out waterdrops on the surface of the samples carefully; and measuring the weight.

$$\text{water absorption}=(W1-W0)/W0\times 100$$

W0: weight (g) before test
W1: weight (g) after test

Conditions for finding the compression set (CS) were as follows: compressing samples of the hollow shape 100 (100 mm long) as shown in FIG. 2 up to 50% of the height; treating the samples under a condition of 70° C.×200 hrs; and explaining the heights before and after the treatment in numbers. Conditions for measuring the height after the treatment were as follows: releasing the samples from the compression immediately after the treatment under the condition of 70° C.×200 hrs; and subjecting the sample to an atmosphere of 23° C. for 30 minutes.

$$\text{compression set (CS)}=(t0-t1)/(t0-ts)\times 100$$

t0: height before treatment (mm)
t1: height after treatment (mm)
ts: 50% of height of t0 (mm)

Tensile test (50% modulus, 100% modulus, fracture strength, fracture elongation) is based on JIS K6251. The test pieces were picked from the samples of the hollow shape 100.

TABLE 3

| property item | | unit | ordinary article | invenetd article |
|---|---|---|---|---|
| specific gravity | | — | 0.55 | 0.49 |
| water absorption | | % | 1 | 1 |
| compression set (70° C. × 200 hrs) | | % | 31 | 24 |
| tensile test | 50% modulus | MPa | 5.1 | 5.1 |
| | 100% modulus | MPa | 10.9 | 11.4 |
| | fracture strength | MPa | 25.1 | 29 |
| | fracture elongation | % | 228 | 240 |

Table 3 shows that the compression set of the invented article is 24% which is lower than the compression set of 31% of the ordinary article.

In the present embodiment, the weather strip 20 is configured to operably couple to the peripheral edge of the side door 1 and configured to make elastic contact with the peripheral edge of the opening in the body 2 of the automobile. But the present invention is also applicable to every weather strip. Examples of the weather strips include door opening seals configured to operably couple to panels including back doors, trunk lids, and hoods of the automobiles and the weather strips including weather strips for trunks.

Also, in the present embodiment, the seal member is hollow. But the present invention is also applicable to the seal members having a shape of a lip.

We claim:

1. A weather strip comprising:
an installation base member configured to operably couple to at least one of a peripheral edge of a panel and a peripheral edge of an opening in a body of an automobile; and
a seal member integrally molded with the installation base member, the seal member being configured to make elastic contact with the other one of the peripheral edge of the panel and the peripheral edge of the opening in the body of the automobile when the panel is in a closed position,
wherein the seal member comprises a rubber sponge material having a specific gravity that falls within a range of 0.35 to 0.65 and a loss elastic modulus of not more than 0.25 MPa.

2. The weather strip as claimed in claim 1, wherein the loss elastic modulus of the rubber sponge material is not more than 0.20 MPa.

3. The weather strip as claimed in claim 2, wherein the seal member comprises a hollow seal member and has a compression set of not more than 25%.

4. The weather strip as claimed in claim 1, wherein the seal member comprises a hollow seal member and has a compression set of not more than 25%.

5. The weather strip as claimed in claim 1, wherein the rubber sponge material mainly includes ethylene-propylene-diene rubber.

6. The weather strip as claimed in claim 1, wherein the rubber sponge material comprises ethylene-propylene-diene rubber.

* * * * *